(12) United States Patent
Soderfelt et al.

(10) Patent No.: US 7,057,849 B2
(45) Date of Patent: Jun. 6, 2006

(54) DATA STORAGE DEVICE WITH DAMPERS

(75) Inventors: Wayne Soderfelt, Westminster, CO (US); Jim Woods, Arvada, CO (US)

(73) Assignee: ESGW Holding Limited, Tortola (VG)

( * ) Notice: Subject to any disclaimer, the term of this patent is extended or adjusted under 35 U.S.C. 154(b) by 133 days.

(21) Appl. No.: 10/749,992

(22) Filed: Dec. 31, 2003

(65) Prior Publication Data

US 2005/0141132 A1    Jun. 30, 2005

(51) Int. Cl.
*G11B 17/02* (2006.01)

(52) U.S. Cl. .............................. 360/97.01; 360/99.08; 360/264.7

(58) Field of Classification Search ...................... None
See application file for complete search history.

(56) References Cited

U.S. PATENT DOCUMENTS

| 4,491,888 A | * | 1/1985 | Brown et al. | ............ 360/97.03 |
| 5,602,697 A | * | 2/1997 | Jeong et al. | ............ 360/97.02 |
| 6,256,173 B1 | * | 7/2001 | Chee et al. | ............ 360/265.7 |

* cited by examiner

*Primary Examiner*—Robert S. Tupper
(74) *Attorney, Agent, or Firm*—Saile Ackerman LLC; Stephen B. Ackerman

(57) ABSTRACT

A data storage device includes a baseplate (10), a head stack (50), a disk stack (90), a spindle motor (80) first damper (20) and second dampers (30). The head stack is received in the baseplate with the second damper underlying between the head stack and the baseplate. The disk stack combined with the spindle motor is received in the baseplate with the first damper underlying between the disk stack and the baseplate for absorbing vibration and improving dynamic head loading property of the data storage device.

20 Claims, 3 Drawing Sheets

DATA STORAGE DEVICE WITH DAMPERS

BACKGROUND OF THE INVENTION

1. Field of the Invention

The present invention relates to data storage devices for apparatuses such as computers, and more particularly to a data storage device incorporating a series of dampers for absorbing vibration and improving dynamic properties of the data storage device.

2. Description of Related Art

Various data storage devices are installed in electronic apparatus for communication and handling of data. Such devices include, for example, hard disk drives, floppy disk drives and CD-ROM (Compact Disk-Read Only Memory) drives. Such data storage devices are being required to meet increasingly stringent physical and operating environment requirements. In particular, durability under harsh environmental conditions is an essential characteristic of a data storage device installed in a modern portable computer.

In current disk drive products, the most commonly used type of actuator is a rotary moving coil actuator. Disks themselves are typically mounted on a hub. Disk flanges or disk spacers are used to mount the disks. Every disk has a circular inner hole stamped therein to receive the hub. Any residual distortion of an inside periphery of the disk resulting from the stamping process can adversely affect the surface condition of the entire disk, because the affected surface is forced down against another component like a disk flange or a disk spacer or clamp.

Digital data are written to and read from a thin layer of magnetized material on the surface of rotating disks. Writing and reading operations are performed by a transducer, which is carried in a slider body. The slider and transducer are sometimes collectively referred to as a head, and typically a single head is associated with a single disk surface. The heads are selectively moved under the control of electronic circuitry to any circular, concentric data tracks on the disk surface by an actuator device. As the disk rotates, the air above the surface of the disk develops a self-acting lifting force that causes the head to lift and fly several microinches above the disk surface. As the flying height of the head above the disk sometimes comes down, there is a need to minimize the inherent vibration of components that make up the disk stack so that the heads can be safely flown across the disk surface while the flying height is reduced. In particular, it is necessary to minimize the impact on a hard disk arising from the components that make up the disk stack, in order to improve the dynamic head loading properties of the data storage device.

There is also a need to reduce the vibrations caused by external impact or innate instability of the disk stack or head stack, in order to minimize the risk of damage to the hard disk surfaces.

However, in a typical data storage device, a spindle motor is directly attached to a baseplate by screws, which constitutes a so-called hard connection. With a typical data storage device having a hard connection, it is problematic to keep the data storage device under stringent physical and operating environments so that it can operate normally.

SUMMARY OF THE INVENTION

Accordingly, an object of the present invention is to provide a data storage device incorporating dampening, for absorbing vibrations and improving dynamic properties of the data storage device.

To achieve the above object, a data storage device comprises a baseplate, a head stack, a disk stack, a spindle motor and a first and second dampers. The head stack is received in the baseplate with the second damper underlying between the head stack and the baseplate. The disk stack combined with the spindle motor is received in the baseplate with the first damper underlying between the disk stack and the baseplate for absorbing vibration and improving dynamic head loading property of the data storage device.

Other objects, advantages and novel features of the present invention will be drawn from the following detailed description of preferred embodiments of the present invention with the attached drawings, in which:

DESCRIPTION OF THE PREFERRED EMBODIMENT

Figure 1:
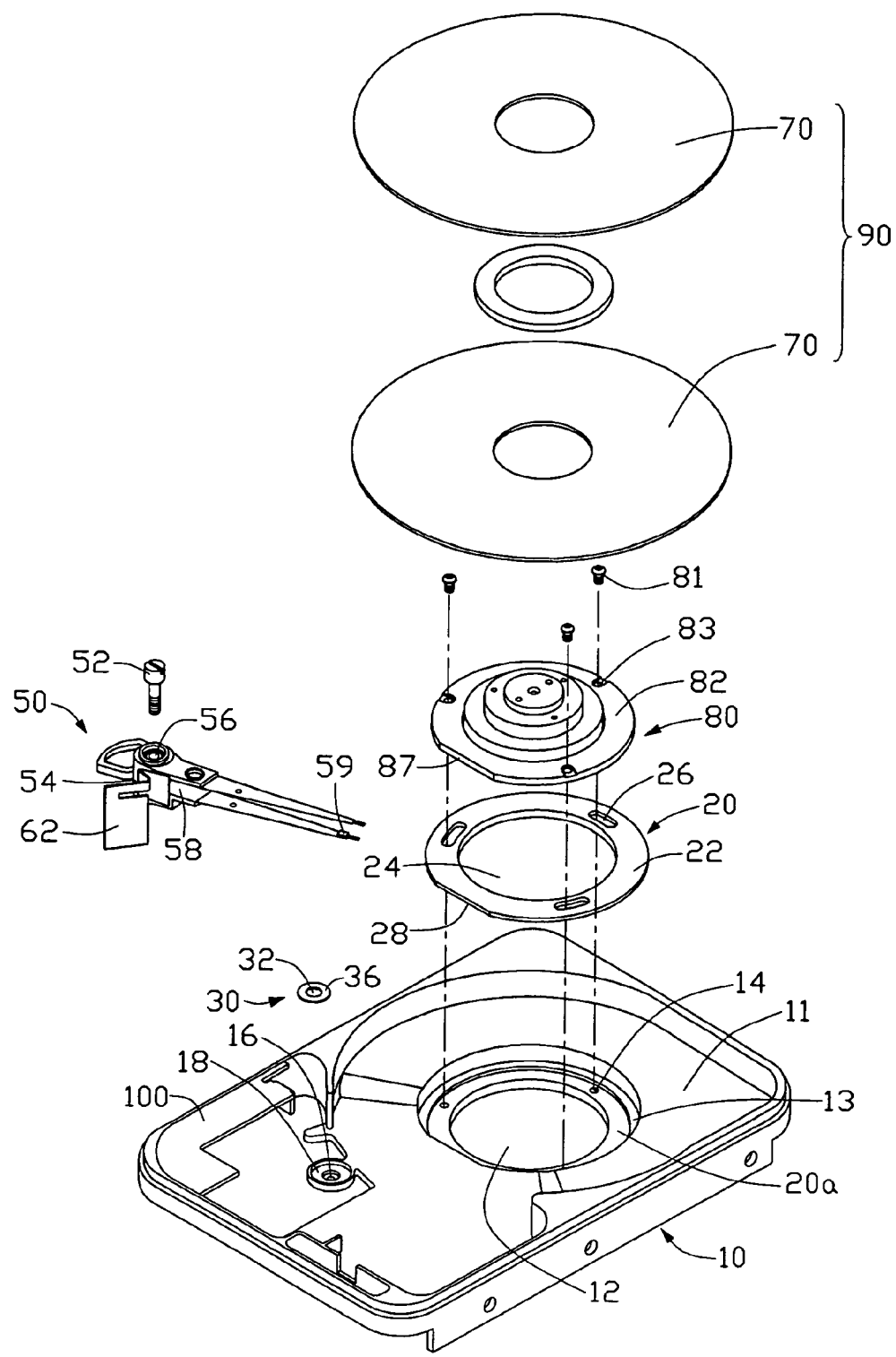
FIG. 1 is an exploded, isometric view of a data storage device in accordance with a preferred embodiment of the present invention.

Referring to FIG. 1, a data storage device in accordance with the preferred embodiment of the present invention comprises a baseplate 10, first and second dampers 20, 30, a head stack 50, a disk stack 90 and a corner portion 100. The disk stack 90 is mounted to a spindle motor 80. The first and second dampers 20, 30 respectively underlie bottoms of the spindle motor 80 and the head stack 50, and have predetermined resiliencies capable of providing stable support and suitable vibration absorption. The first damper 20 comprises a first ring 22. The first ring 22 defines a central hole 24, and three fixing holes 26. A chord portion 28 is defined at an outer periphery of the first ring 22, for locating the first damper 20 on the baseplate 10. The second damper 30 comprises a second ring 36 defining a central hole 32 therethrough.

The baseplate 10 is rectangular, and defines a round recess 11 for receiving the disk stack 90 and an irregular recess (not labeled) for accommodating the head stack 50 and the corner portion 100. The irregular recess defines a screw hole 16 and a dent 18 around the screw hole 16, for receiving the head stack 50. The dent 18 corresponds to the second damper 30, and snugly receives the second damper 30 to insure that the second damper 30 cannot be squeezed out from the dent 18. A stepped central through opening 12 is defined in the baseplate 10 below and in communication with the round recess 11. A step 13 is thus formed in the baseplate 10 around a bottom portion of the through opening 12. A plurality of screw holes 14 is defined in the step 13. A circumferential sidewall of the baseplate 10 surrounding a top portion of the through opening 12 defines a flat locating portion (not labeled), corresponding to the chord portion 28 of the first damper 20. A top face of the step 13 defines a circular dent 20a corresponding to the configuration of the first damper 20. The dent 20a snugly receives the outer diameter of the first damper 20, to insure that the first damper 20 cannot be squeezed out from the dent 20a.

Figure 3:
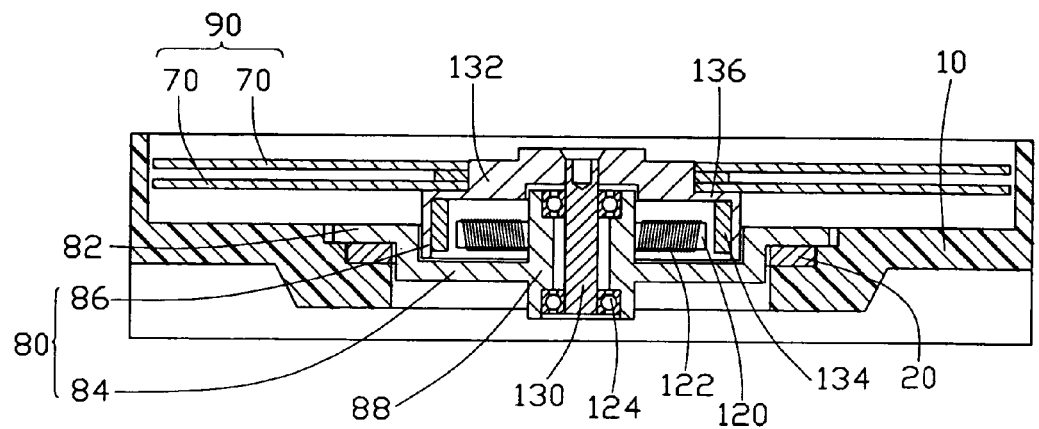
FIG. 3 is a schematic, cross-sectional view taken along III—III of FIG. 2.

Referring to FIGS. 1 and 3, the disk stack 90 comprises at least one hard disk 70. In the illustrated embodiment of the present invention, the disk stack 90 comprises two hard disks 70. The disk stack 90 is mounted onto the spindle motor 80. A surface of each hard disk 70 is coated with a thin layer of magnetized material, for storage of information. The spindle motor 80 is mounted to the baseplate 10 by a plurality of screws 81. The spindle motor 80 comprises a stator 84 and a rotor 86. The stator 84 comprises a central tubular base portion 88, and an upper circumferential flange 82. The flange 82 defines a plurality of fixing holes 83 therein for extension of the screws 81 thereinto. A locating chord portion 87 is defined at an outer periphery of the flange 82, for locating the spindle motor 80 on the baseplate 10. A plurality of stator laminations 120 extends radially outwardly from the base portion 88. A winding 122 is wound around each stator lamination 120. A pair of bearings 124 is received in the base portion 88, the bearings 124 rotatably connecting the rotor 86 to the stator 84.

The rotor 86 comprises a spindle shaft 130, a hub 132 fixed around a top end of the spindle shaft 130, and an annular magnet 134 attached to an inside of the hub 132. The spindle shaft 130 is received in the base portion 88, and connected with the bearings 124. The rotor 86 is thus rotatably connected to the stator 84. The hub 132 comprises a lower circumferential shoulder 136. The disk stack 90 is engaged around the hub 132, with a bottom one of the hard disks 70 of the disk stack 90 supported on the shoulder 136, and a top one of the hard disks 70 of the disk stack 90 being engaged on the hub 132 by a clamp (not shown). The clamp can be fixed to the hub 132 by setscrews (not shown). The magnet 134 closely surrounds the stator laminations 120, thereby defining a cylindrical gap between the stator laminations 120 and the magnet 134.

Figure 2:
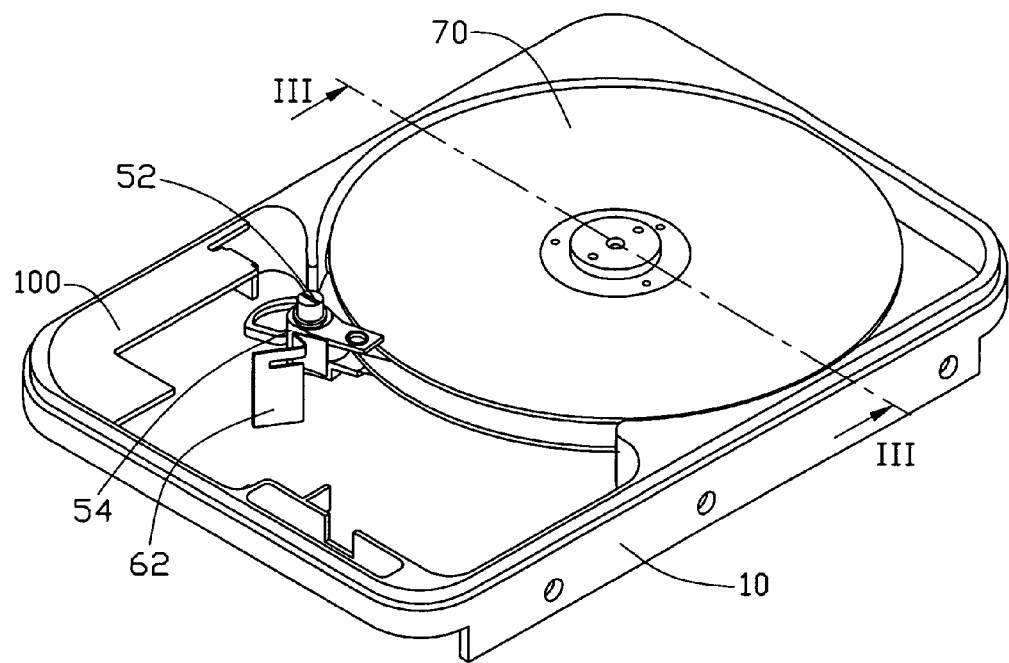
FIG. 2 is an assembled view of FIG. 1.
Figure 4:
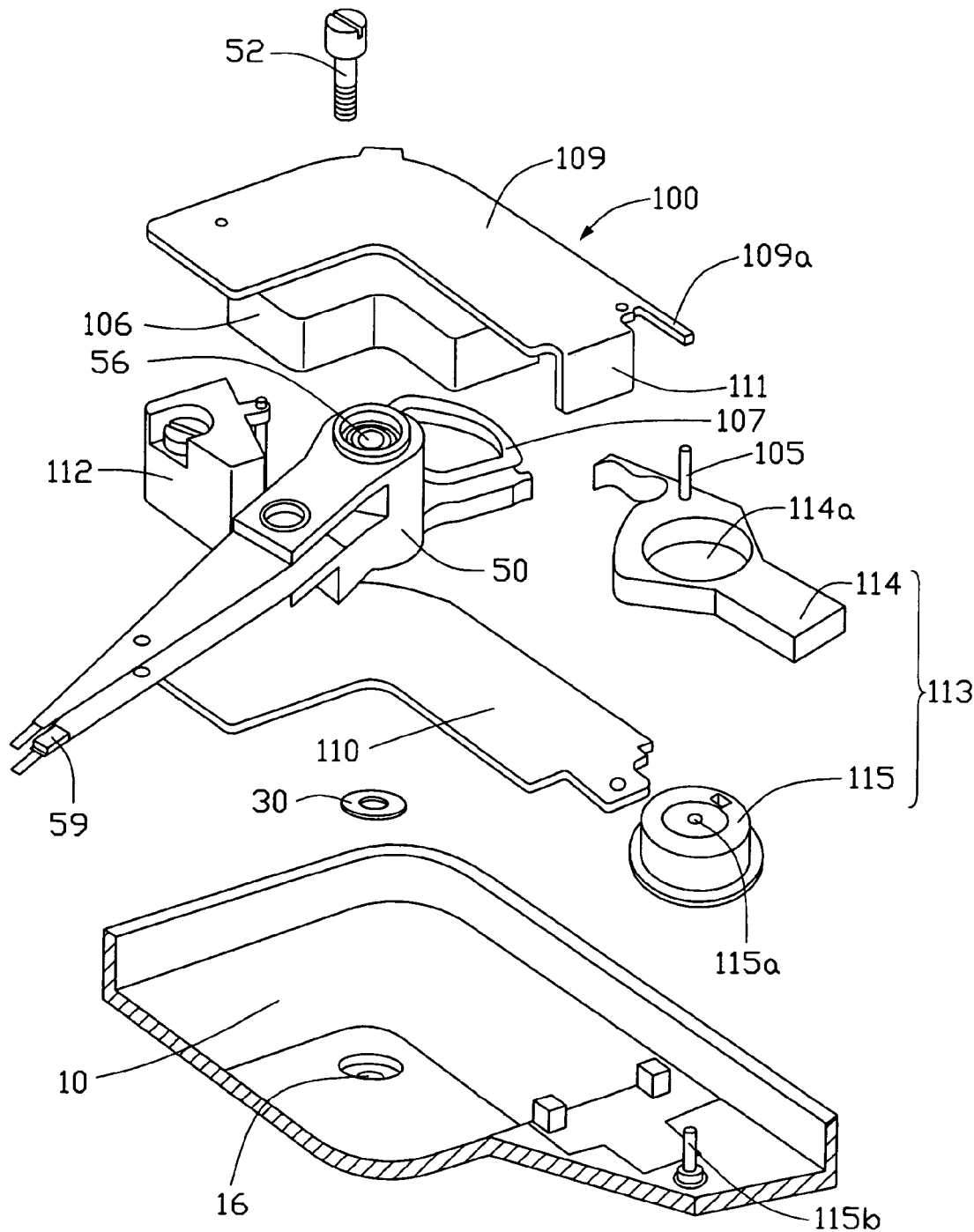
FIG. 4 is an enlarged, exploded view of a corner portion and a head stack of the data storage device of FIG. 1, viewed from another aspect.

Referring to FIGS. 1, 2 and 4, the head stack 50 is mounted in the baseplate 10 by a screw shaft 52 having a screw thread at a distal end thereof. The head stack 50 is of the moving coil type. That is, a magnet 106 of the corner portion 100 is maintained in a stationary position, and a movable portion of the head stack 50 includes an actuator coil 107. The head stack 50 is engaged on the baseplate 10, and is rotatable about the screw shaft 52. The head stack 50 further comprises a head positioner assembly 54 defining a fixing bore 56 therein. The head positioner assembly 54 supports a plurality of individual arms 58 each having a read/write transducer head 59 at a distal end thereof. A suitable actuator motor (not shown) such as a movable coil motor is provided, together with a corresponding motor controller 62. The actuator motor and motor controller 62 are used to displace the read/write transducer heads 59 through generally radial traverses relative to the hard disks 70.

Referring to FIG. 4, the corner portion 100 comprises an inertial latch 113. The inertial latch 113 is pivotally engaged in the baseplate 10, and comprises a generally columnar shaft body 115 and an inertial body 114. The shaft body 115 defines a mounting hole 115a, the mounting hole 115a engagingly receiving a shaft 115b that extends upwardly from the baseplate 10. The inertial body 114 defines a round hole 114a in a middle thereof, the round hole 114a engagingly receiving the shaft body 115. A magnetic flux field is established through the coil 107 by use of the magnet 106, which is attached to an underside of a top plate 109 so that the magnet 106 is positioned above a top of the head stack 50. A bottom plate 110 of the corner portion 100 provides a lower portion of the magnetic flux field in conjunction with a tab 111 that depends from the top plate 109. A protrusion 109a of the top plate 109 serves as a stop for a pin 105 that extends upwardly from the inertial body 114, thereby preventing the inertial latch 113 from rotating too far in a clockwise direction. A stop assembly 112 is positioned between the top plate 109 and the bottom plate 110 for restricting movement of the head stack 50. The stop assembly 112 prevents over-rotation of the read/write transducer heads 59. That is, the read/write transducer heads 59 are prevented from leaving the surfaces of the hard disks 70 or hitting other components.

Referring to FIGS. 1, 2 and 3, in mounting the spindle motor 80 on the baseplate 10, the first damper 20 is placed in the corresponding dent 20a in the step 13 of the baseplate 10, with the fixing holes 26 of the first damper 20 aligned with the screw holes 14 of the step 13. The spindle motor 80 is received in the through opening 12 of the baseplate 10, with the fixing holes 83 of the spindle motor 80 aligned with the fixing holes 26 of the first damper 20. The screws 81 are extended through the fixing holes 83, 26, and engaged in the screw holes 14 of the step 13. The hard disks 70 of the disk stack 90 are fixed on the hub 132 of the rotor 86 by a clamp (not shown). Thus the first damper 20 is sandwiched between the flange 82 of the stator 84 and the step 13 of the baseplate 10. The first damper 20 is capable of stable support and suitable vibration absorption, because of its predetermined resiliency.

In mounting the head stack 50 on the baseplate 10, the second damper 30 is placed in the dent 18 of the baseplate 10. The screw shaft 52 is extended through the fixing hole 56 of the head stack 50 and the central hole 32 of the second damper 30 and engaged in the screw hole 16 of the baseplate 10. The read/write transducer heads 59 are in close proximity with respective upper and lower surfaces of the hard disks 70. Thus the second damper 30 is sandwiched between a bottom of the head stack 50 and the baseplate 10 at the dent 18. The second damper 30 is capable of stable support and suitable vibration absorption, because of its predetermined resiliency. Thus dynamic head loading properties of the read/write transducer heads 59 are improved.

While the present invention has been illustrated by the description of preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A data storage device comprising:
   a baseplate defining a pair of spaces;
   a motor received in one of the pair of spaces of the baseplate, the motor comprising a stator having a flange for securing the motor to the baseplate, and a rotor rotatably connected with the stator;
   a disk stack having at least one disk mounted on the rotor; and
   a head stack received in the other one of the pair of spaces of on the baseplate, the head stack comprising a head positioner assembly supporting a plurality of individual arms having read/write transducer heads at distal ends thereof in close proximity with respective upper and lower surfaces of the at least one disk;
   wherein a first damper, having resilience, is snugly received within a first dent in the baseplate and is sandwiched between said first dent and the flange in a manner whereby said first damper absorbs vibrations.

2. The data storage device as claimed in claim 1 wherein a second damper, having resilience, is snugly received within a second dent in said baseplate and sandwiched between said second dent and the head stack for improving dynamic head loading properties of the read/write transducer heads.

3. The data storage device as claimed in claim 2 wherein the first and second dents in which the first and second dampers are respectively disposed to prevent the first and second dampers respectively from being squeezed out after the data storage device is assembled.

4. The data storage device as claimed in claim 3 wherein the head positioner assembly defines a fixing bore, and the second damper sandwiched between the head stack and the baseplate defines a central hole.

5. The data storage device as claimed in claim 4 wherein the baseplate defines a screw hole under the dent having the second damper, and a screw shaft having a screw thread at a distal end thereof extends through the fixing bore of the head positioner assembly and the central hole of the second damper to engage in the screw hole thereby attaching the head stack to the baseplate.

6. The data storage device as claimed in claim 1 wherein said one of the pair of spaces receiving the motor defines a stepped central through opening thereby forming a step supporting the motor.

7. The data storage device as claimed in claim 1 wherein the flange of the motor and the first damper under the motor respectively define a plurality of fixing holes for extension of fasteners therethrough to connect the motor to the baseplate.

8. The data storage device as claimed in claim 7 wherein the stator of the motor is combined with a plurality of radially extending stator laminations.

9. The data storage device as claimed in claim 8 wherein the rotor of the motor comprises a hub for rotatably mounting the disk stack thereon, and an annular magnet encircling the stator laminations.

10. The data storage device as claimed in claim 1 wherein said motor is received in a first recess defined in said baseplate.

11. The data storage device as claimed in claim 1 wherein said head stack is received in a second recess defined in said baseplate.

12. A data storage device comprising:
a baseplate defining a pair of spaces;
a motor received in one of the pair of spaces of the baseplate, the motor comprising a stator and a rotor rotatably engaged with the stator, the stator having a flange for securing the motor to the baseplate;
a disk stack having at least one disk mounted on the rotor;
a head stack received in the other one of the pair of spaces of the baseplate, the head stack comprising a head positioner assembly supporting a plurality of individual arms having read/write transducer heads at distal ends thereof in close proximity to respective upper and lower surfaces of the at least one disk; and
a first damper, having resilience, is snugly received within a first dent in the baseplate and is sandwiched between said first dent and the head stack in a manner whereby said first damper absorbs vibrations.

13. The data storage device as claimed in claim 12 wherein a second damper, having resilience, is snugly received within a first dent in the baseplate and sandwiched between the first dent and the flange of the motor in a manner whereby the second damper absorbs vibrations.

14. The data storage device as claimed in claim 13 wherein the baseplate respectively defines dents in which the dampers are disposed, for preventing the dampers from being squeezed out after the data storage device is assembled.

15. The data storage device as claimed in claim 12 wherein said one of the pair of spaces receiving the motor defines a stepped central through opening thereby forming a step supporting the motor.

16. The data storage device as claimed in claim 12 wherein the flange of the motor and the damper under the motor respectively define a plurality of fixing holes for extension of fasteners therethrough to connect the motor to the baseplate.

17. The data storage device as claimed in claim 12 wherein the head positioner assembly defines a fixing bore, and the damper sandwiched between the head stack and the baseplate defines a central hole.

18. The data storage device as claimed in claim 17 wherein the baseplate defines a screw hole under the dent having the damper, and a screw shaft having a screw thread at distal end thereof extends through the fixing bore of the head positioner assembly and the central hole of the damper to engage in the screw hole thereby attaching the head stack to the baseplate.

19. The data storage device as claimed in claim 12 wherein said motor is received in a first recess defined in said baseplate.

20. The data storage device as claimed in claim 12 wherein said head stack is received in a second recess defined in said baseplate.

* * * * *